United States Patent
Jayasinghe Laddu

(10) Patent No.: US 12,367,122 B2
(45) Date of Patent: Jul. 22, 2025

(54) MODEL MONITORING PROCEDURE FOR BEAM PREDICTION USE CASE

(71) Applicant: Nokia Technologies Oy, Espoo (FI)

(72) Inventor: Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 30 days.

(21) Appl. No.: 18/422,254

(22) Filed: Jan. 25, 2024

(65) Prior Publication Data
US 2024/0281348 A1    Aug. 22, 2024

Related U.S. Application Data

(60) Provisional application No. 63/447,395, filed on Feb. 22, 2023.

(51) Int. Cl.
*G06F 11/22* (2006.01)

(52) U.S. Cl.
CPC ................. *G06F 11/2257* (2013.01)

(58) Field of Classification Search
CPC .......... G06F 11/2257; H04B 7/0695
USPC .......................................... 714/26
See application file for complete search history.

(56) References Cited

U.S. PATENT DOCUMENTS

2024/0019528 A1*  1/2024  Zorgui ................ G01S 5/0244

FOREIGN PATENT DOCUMENTS

WO    2022/222089 A1    10/2022
WO    2022/236807 A1    11/2022

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

(Continued)

*Primary Examiner* — Yair Leibovich
(74) *Attorney, Agent, or Firm* — Robert P. Michal, Esq.; Carter, DeLuca & Farrell LLP

(57) ABSTRACT

In accordance with example embodiments of the invention, a user equipment receives or sends information to trigger model failure detection (MFD), wherein the trigger is based on a machine learning model or machine learning model functionality to initiate an MFD count in a medium access control layer, wherein MFD is using an MFD window in the medium access control layer and wherein one MFD count in the medium access control layer is determined by at least one model failure instances of the machine learning model or model functionality usage in a physical layer; and determining by the user equipment or a network the model failure for the machine learning model or machine learning model functionality when the MFD count in the medium access control layer is equal to or above a maximum model failure count prior to the end of the MFD window in the medium access control layer.

17 Claims, 7 Drawing Sheets

(56) References Cited

OTHER PUBLICATIONS

"3rd Generation Partnership Project; Technical Specification Group Radio Access Network; NR; Physical layer procedures for control (Release 17)", 3GPP TS 38.213, V17.4.0, Dec. 2022, pp. 1-258.

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

"Msc-generator", Sourceforge, Retrieved on Feb. 5, 2024, Webpage available at :https://sourceforge.net/projects/msc-generator/.

"Discussion on AI/ML for beam management", 3GPP TSG-RAN WG1 Meeting #111, Tdoc R1-2211289, Agenda: 9.2.3.2, Ericsson, Nov. 14-18, 2022, 18 pages.

"Discussion on AI/ML for beam management", 3GPP TSG RAN WG1 #110bis-e, R1-2208970, Agenda: 9.2.3.2, CATT, Oct. 10-19, 2022, 10 pages.

Extended European Search Report received for corresponding European Patent Application No. 24153341.3, dated Jul. 11, 2024, 8 pages.

\* cited by examiner

| Terminology | Description |
|---|---|
| Data collection | A process of collecting data by the network nodes, management entity, or UE for the purpose of AI/ML model training, data analytics and inference |
| AI/ML Model | A data driven algorithm that applies AI/ML techniques to generate a set of outputs based on a set of inputs. |
| AI/ML model training | A process to train an AI/ML Model [by learning the input/output relationship] in a data driven manner and obtain the trained AI/ML Model for inference |
| AI/ML model Inference | A process of using a trained AI/ML model to produce a set of outputs based on a set of inputs |
| AI/ML model validation | A subprocess of training, to evaluate the quality of an AI/ML model using a dataset different from one used for model training, that helps selecting model parameters that generalize beyond the dataset used for model training. |
| AI/ML model testing | A subprocess of training, to evaluate the performance of a final AI/ML model using a dataset different from one used for model training and validation. Differently from AI/ML model validation, testing does not assume subsequent tuning of the model. |
| UE-side (AI/ML) model | An AI/ML Model whose inference is performed entirely at the UE |
| Network-side (AI/ML) model | An AI/ML Model whose inference is performed entirely at the network |
| One-sided (AI/ML) model | A UE-side (AI/ML) model or a Network-side (AI/ML) model |
| Two-sided (AI/ML) model | A paired AI/ML Model(s) over which joint inference is performed, where joint inference comprises AI/ML Inference whose inference is performed jointly across the UE and the network, i.e, the first part of inference is firstly performed by UE and then the remaining part is performed by gNB, or vice versa. |
| AI/ML model transfer | Delivery of an AI/ML model over the air interface, either parameters of a model structure known at the receiving end or a new model with parameters. Delivery may contain a full model or a partial model. |
| Model download | Model transfer from the network to UE |
| Model upload | Model transfer from UE to the network |
| Federated learning / federated training | A machine learning technique that trains an AI/ML model across multiple decentralized edge nodes (e.g., UEs, gNBs) each performing local model training using local data samples. The technique requires multiple interactions of the model, but no exchange of local data samples. |
| Offline field data | The data collected from field and used for offline training of the AI/ML model |
| Online field data | The data collected from field and used for online training of the AI/ML model |
| Model monitoring | A procedure that monitors the inference performance of the AI/ML model |
| Supervised learning | A process of training a model from input and its corresponding *labels*. |
| Unsupervised learning | A process of training a model without labelled data. |
| Semi-supervised learning | A process of training a model with a mix of labelled data and unlabelled data |
| Reinforcement Learning (RL) | A process of training an AI/ML model from input (a.k.a. state) and a feedback signal (a.k.a. reward) resulting from the model's output (a.k.a. action) in an environment the model is interacting with. |
| Model activation | enable an AI/ML model for a specific function |
| Model deactivation | disable an AI/ML model for a specific function |
| Model switching | Deactivating a currently active AI/ML model and activating a different AI/ML model for a specific function |

FIG. 1A

| Proprietary-format models | ML models of vendor-/device-specific proprietary format, from 3GPP perspective<br>NOTE: An example is a device-specific binary executable format |
|---|---|
| Open-format models | ML models of specified format that are mutually recognizable across vendors and allow interoperability, from 3GPP perspecive |

FIG. 1B

| Terminology | Description |
|---|---|
| Model identification | A process/method of identifying an AI/ML model for the common understanding between the NW and the UE<br>Note: The process/method of model identification may or may not be applicable.<br>Note: Information regarding the AI/ML model may be shared during model identification. |

| Terminology | Description |
|---|---|
| Functionality identification | A process/method of identifying an AI/ML functionality for the common understanding between the NW and the UE<br>Note: Information regarding the AI/ML functionality may be shared during functionality identification.<br>FFS: granularity of functionality |

FIG. 1C

410: receiving, by a user equipment of a communication network, from a network node a radio resource control configuration comprising information to trigger model failure detection

↓

420: wherein the trigger is based on a machine learning model or machine learning model functionality to initiate a model failure detection count in a medium access control layer

↓

430: wherein model failure detection is using a model failure detection window in the medium access control layer

↓

440: wherein one model failure detection count in the medium access control layer is determined by at least one model failure instances of the machine learning model or model functionality usage in a physical layer

↓

450: determining by the user equipment the model failure for the machine learning model or machine learning model functionality when the model failure detection count in the medium access control layer is equal to or above a maximum model failure count prior to the end of the model failure detection window in the medium access control layer

FIG. 4A

MODEL MONITORING PROCEDURE FOR BEAM PREDICTION USE CASE

RELATED APPLICATION:

This application claims priority from, and the benefit of, U.S. Provisional Application No. 63/447,395, filed on Feb. 22, 2023, the contents of which is incorporated herein by reference in its entirety.

TECHNICAL FIELD:

The teachings in accordance with the exemplary embodiments of this invention relate generally to a new machine learning-dedicated bearer for machine learning or artificial intelligence related data exchange and, more specifically, relate to a new machine learning-dedicated bearer for machine learning or artificial intelligence related data exchange related to model control and management.

BACKGROUND:

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AI Artificial Intelligence
BP Beam Prediction
CA Carrier Aggregation
CE Control Element
CSI Channel Status Information
DC Dual Connectivity
DCI Downlink Control Indicator
DL Downlink
FFS For Further Study
ID Identification
MAC Medium Access Control
MFD Model Failure Detection
MUSIM Multi Universal Subscriber Identity Module
ML Machine Learning
NTWK Network
PHY Physical
PS Packet Switched
RACH Random Access Channel
RAN Random Access Network
RRC Radio Resource Control
RS Reference Signal
RSRP Reference Signal Received Power
Rx Receiver
TDM Time Division Multiplexing
Tx Transmitter
UAI Assistance Information
UE User Equipment
UL Uplink
USIM Universal Subscriber Identity Module Some standards at the time of this application are based on studies on Artificial Intelligence (AI)/Machine Learning (ML) for NR Air Interface. One goal is to explore the benefits of augmenting the air interface with features enabling improved support of AI/ML-based algorithms for enhanced performance and/or reduced complexity/overhead. Several use cases are considered to enable the identification of a common AI/ML framework, including functional requirements of AI/ML architecture, which could be used in subsequent projects.

For AI/ML enhancements related to beam management, two sub-use cases have been identified: beam prediction in the spatial domain and beam prediction in the time domain. One primary motivation is to support a reduced overhead and lower beam measurements and reporting latency.

The beam prediction using AI/ML model inference where a set of output is produced by a trained AI/ML model based on a set of input, include set of beam measurements (Set B) and a different/larger set of beams (Set A) from which best beams are to be predicted. The UE uses the Set B as the input of an ML model which predicts the best beams from Set A, that is not measured fully by the UE.

Later on, model monitoring was also considered important for both BM-Case1 and BM-Case2, where several more agreements were made in to support further discussions on that.

However, inference by the model for beam prediction in changed radio parameters or network conditions have high probability of having errors. Also, beam prediction in a new environment, conditions or parameters would require monitoring of the ML model.

Example embodiments of this invention proposes improved operations for model monitoring procedures such as for beam prediction.

SUMMARY:

This section contains examples of possible implementations and is not meant to be limiting.

In another example aspect of the invention, there is an apparatus, such as a user equipment side apparatus, comprising: at least one processor; and at least one non-transitory memory storing instructions, that when executed by the at least one processor, cause the apparatus at least to: receive, by a user equipment of a communication network, from a network node a radio resource control configuration comprising information to trigger model failure detection, wherein the trigger is based on a machine learning model or machine learning model functionality to initiate a model failure detection count in a medium access control layer, wherein model failure detection is using a model failure detection window in the medium access control layer and wherein one model failure detection count in the medium access control layer is determined by at least one model failure instances of the machine learning model or model functionality usage in a physical layer; and determine by the user equipment the model failure for the machine learning model or machine learning model functionality when the model failure detection count in the medium access control layer is equal to or above a maximum model failure count prior to the end of the model failure detection window in the medium access control layer.

In still another example aspect of the invention, there is a method, comprising: receiving, by a user equipment of a communication network, from a network node a radio resource control configuration comprising information to trigger model failure detection, wherein the trigger is based on a machine learning model or machine learning model functionality to initiate a model failure detection count in a medium access control layer, wherein model failure detection is using a model failure detection window in the medium access control layer and wherein one model failure detection count in the medium access control layer is determined by at least one model failure instances of the machine learning model or model functionality usage in a physical layer; and determining by the user equipment the model failure for the machine learning model or machine learning model functionality when the model failure detection count in the medium access control layer is equal to or above a maximum model failure count prior to the end of the model failure detection window in the medium access control layer.

A further example embodiment is an apparatus and a method comprising the apparatus and the method of the previous paragraphs, wherein the information to trigger is providing model failure detection reference signal resources for model failure detection comprising at least one of synchronization signal blocks or channel state information reference signals, wherein the information to trigger comprises at least one of: model failure detection reference signals or $Q\_0$, model failure detection window or $T\_MFD$, model failure detection max failure count or L, model failure detection physical threshold, reference signal received power, model_accuracy, or other model failure detection related parameters or uplink resources to be used for reporting model failures, wherein the model failure detection window in the medium access control layer is a time window in a range of milliseconds or seconds, wherein the radio resource control configuration comprises a list of separate information elements associated with machine learning model functionalities and identifications, wherein there is starting with a medium access control entity the model failure detection window for a given machine learning model or functionality, wherein the given machine learning model or functionality is associated with the list of separate information elements associated with machine learning model functionalities and identifications, wherein a medium access control maintained failure has a starting count starting from one of zero or an end of a previous model failure detection window, wherein there is indicating with the medium access control entity to a physical layer the start of the model failure detection window and measurements of model failure detection reference signals, and requesting reporting of physical layer model failures to the medium access control entity, wherein there is comparing a received signal quality based on reference signal received power with a pre-configured or defined threshold for an expected signal quality of a model monitoring resource $Q\_0$; and determining a failure instance if the signal quality of the model monitoring resource $Q\_0$ is below the pre-configured/defined threshold, wherein there is comparing the machine learning model output giving best-predicted beams with a model monitoring resource $Q\_0$; and determining a failure instance if the model monitoring resource $Q\_0$ is not within the best-predicted beams, and/or wherein there is sending by the user equipment a beam prediction report based on a model failure detection count being equal to or above the pre-determined model failure detection physical threshold during the model failure detection window.

A non-transitory computer-readable medium storing program code, the program code executed by at least one processor to perform at least the method as described in the paragraphs above.

In yet another example aspect of the invention, there is an apparatus comprising: means for receiving, by a user equipment of a communication network, from a network node a radio resource control configuration comprising information to trigger model failure detection, wherein the trigger is based on a machine learning model or machine learning model functionality to initiate a model failure detection count in a medium access control layer, wherein model failure detection is using a model failure detection window in the medium access control layer and wherein one model failure detection count in the medium access control layer is determined by at least one model failure instances of the machine learning model or model functionality usage in a physical layer; and means for determining by the user equipment the model failure for the machine learning model or machine learning model functionality when the model failure detection count in the medium access control layer is equal to or above a maximum model failure count prior to the end of the model failure detection window in the medium access control layer.

In accordance with the example embodiments as described in the paragraph above, at least the means for receiving, triggering, and determining comprises a network interface, and computer program code stored on a computer-readable medium and executed by at least one processor.

In another example aspect of the invention, there is an apparatus, such as a network side apparatus, comprising: at least one processor; and at least one non-transitory memory storing instructions, that when executed by the at least one processor, cause the apparatus at least to: send, by a network node of a communication network, a radio resource control configuration comprising information to trigger model failure detection, wherein the trigger is based on a machine learning model or machine learning model functionality to initiate a model failure detection count in a medium access control layer, wherein model failure detection is using a model failure detection window in the medium access control layer and wherein one model failure detection count in the medium access control layer is determined by at least one model failure instances of the machine learning model or model functionality usage in a physical layer.

In still another example aspect of the invention, there is a method, comprising: sending, by a network node of a communication network, a radio resource control configuration comprising information to trigger model failure detection, wherein the trigger is based on a machine learning model or machine learning model functionality to initiate a model failure detection count in a medium access control layer, wherein model failure detection is using a model failure detection window in the medium access control layer and wherein one model failure detection count in the medium access control layer is determined by at least one model failure instances of the machine learning model or model functionality usage in a physical layer.

A further example embodiment is an apparatus and a method comprising the apparatus and the method of the previous paragraphs, wherein the information causes model failure detection count for the model failure for the machine learning model or machine learning model functionality when the model failure detection count in the medium access control layer is equal to or above a maximum model failure count prior to the end of the model failure detection window in the medium access control layer, wherein the information to trigger comprises at least one of: model failure detection reference signals or $Q\_0$, model failure detection window or $T\_MFD$, model failure detection max failure count or L, model failure detection physical threshold, reference signal received power, model_accuracy, or other model failure detection related parameters or uplink resources to be used for reporting model failures, wherein the model failure detection window in the medium access control layer is a time window in a range of milliseconds or seconds, wherein the radio resource control configuration comprises a list of separate information elements associated with machine learning model functionalities and identifications, wherein there is starting with a medium access control entity the model failure detection window for a given machine learning model or functionality, wherein the given machine learning model or functionality is associated with the list of separate information elements associated with machine learning model functionalities and identifications, wherein a medium access control maintained failure has a starting count starting from one of zero or an end of a previous model failure detection window, wherein there is indicating with the medium access control entity to a physical layer the start of the model failure detection window and measurements of model failure detection reference signals, and requesting reporting of physical layer model failures to the medium access control entity, wherein there is comparing a received signal quality based on reference signal received power with a pre-configured or defined threshold for an expected signal quality of a model monitoring resource $Q\_0$; and determining a failure instance if the signal quality of the model monitoring resource $Q\_0$ is below the pre-configured/defined threshold, wherein there is comparing the machine learning model output giving best-predicted beams with a model monitoring resource $Q\_0$; and determining a failure instance if the model monitoring resource $Q\_0$ is not within the best-predicted beams, and/or wherein there is sending by the user equipment a beam prediction report based on a model failure detection count being equal to or above the pre-determined model failure detection physical threshold during the model failure detection window.

A communication system comprising the network side apparatus and the user equipment side apparatus performing operations as described above.

BRIEF DESCRIPTION OF THE DRAWINGS:

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 1A shows a list of terminologies for RAN 1 agreements;

FIG. 1B shows Working Assumption Consider "proprietary model" and "open-format model" as two separate model format categories for RAN1 discussion;

FIG. 1C shows a working assumption for model identification and for functionality identification;

FIG. 4A and FIG. 4B each show a method in accordance with example embodiments of the invention which may be performed by an apparatus.

Figure 2A:
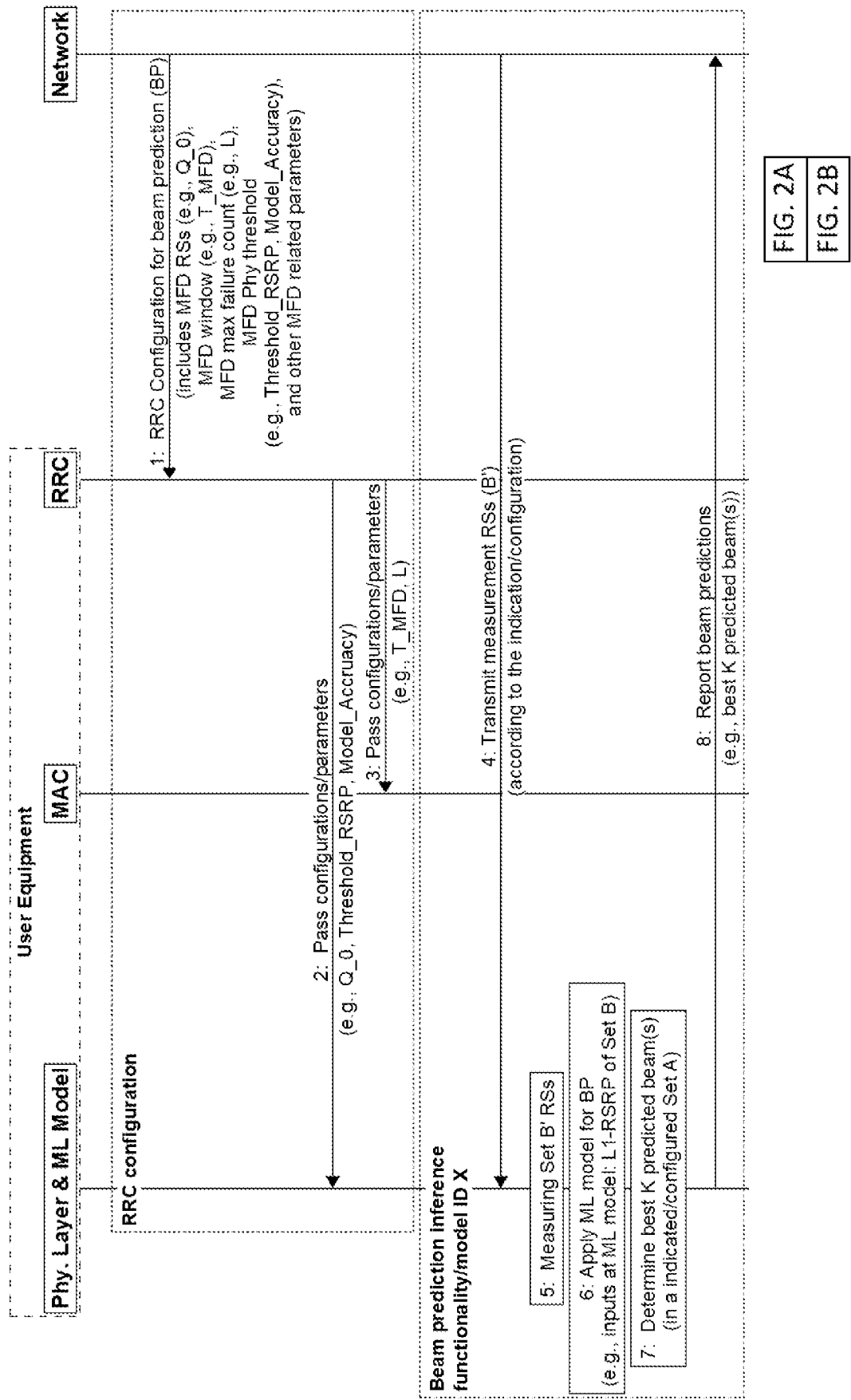
FIG. 2A and FIG. 2B show a signalling diagram for model/functionality failure detection in NR.

DETAILED DESCRIPTION:

In example embodiments of this invention there is proposed at least a method and apparatus for a new machine learning-dedicated bearer for machine learning or artificial intelligence related data exchange related to model control and management.

As similarly stated above, there have been studies on Artificial Intelligence (AI)/Machine Learning (ML) for NR Air Interface, and the objectives are described in RP-213599. In this study item, the goal is to explore the benefits of augmenting the air interface with features enabling improved support of AI/ML-based algorithms for enhanced performance and/or reduced complexity/overhead. Several use cases are considered to enable the identification of a common AI/ML framework, including functional requirements of AI/ML architecture, which could be used in subsequent projects. The study should also identify areas where AI/ML could improve the performance of air-interface functions. Specification impact will be assessed to improve the overall understanding of what would be required to enable AI/ML techniques for the air interface.

For AI/ML enhancements related to beam management, two sub-use cases have been identified in beam prediction in the spatial domain (BM-Case1) and beam prediction in the time domain (BM-Case2). The primary motivation is to support a reduced overhead and lower beam measurements and reporting latency.

In a RAN1 meeting, the following agreements were made on BM-Case1 and BM-Case2:

Agreement

For AI/ML-based beam management, support BM-Case1 and BM-Case2 for characterization and baseline performance evaluations
BM-Case1: Spatial-domain DL beam prediction for Set A of beams based on measurement results of Set B of beams
BM-Case2: Temporal DL beam prediction for Set A of beams based on the historic measurement results of Set B of beams
FFS: details of BM-Case1 and BM-Case2
FFS: other sub-use cases
Note: For BM-Case1 and BM-Case2, Beams in Set A and Set B can be in the same Frequency Range;

Agreement

For the sub-use case BM-Case1, consider both Alt.1 and Alt.2 for further study:
Alt.1: AI/ML inference at NW side,
Alt.2: AI/ML inference at UE side;

Agreement

For the sub use case BM-Case2, consider both Alt.1 and Alt.2 for further study:
Alt.1: AI/ML inference at NW side,
Alt.2: AI/ML inference at UE side;

Later on, model monitoring was also considered important for both BM-Case1 and BM-Case2, where several more agreements were made in RAN1 to support further discussions on that. This paper more focused on the highlighted aspects below, where UE-sided ML models are considered;

Agreement

Study AI/ML model monitoring for at least the following purposes: model activation, deactivation, selection, switching, fallback, and update (including re-training).
FFS: Model selection refers to the selection of an AI/ML model among models for the same functionality. (Exact terminology to be discussed/defined)

Agreement

Regarding the model monitoring for BM-Case1 and BM-Case2, to investigate specification impacts from the following aspects
Performance metric(s)
Benchmark/reference for the performance comparison
Signalling/configuration/measurement/report for model monitoring, e.g., signalling aspects related to assistance information (if supported), Reference signals
Other aspect(s) is not precluded Agreement For BM-Case1 and BM-Case2 with a UE-side AI/ML model, study the following alternatives for model monitoring with potential down-selection:
Atl1. UE-side Model monitoring
 UE monitors the performance metric(s)
 UE makes decision(s) of model selection/activation/o deactivation/switching/fallback operation
Atl2. NW-side Model monitoring
 NW monitors the performance metric(s)
 NW makes decision(s) of model selection/activation/deactivation/switching/fallback operation
Alt3. Hybrid model monitoring
 UE monitors the performance metric(s)
 NW makes decision(s) of model selection/activation/deactivation/switching/fallback operation To facilitate understanding on the terminologies, reference is made to RAN1 agreements on the list of terminologies as in FIG. 1A used for AI/ML.

FIG. 1A shows a list of terminologies for RAN 1 agreements.

FIG. 1B shows Working Assumption Consider "proprietary model" and "open-format model" as two separate model format categories for RAN1 discussion;

A Working Assumption is Considering "proprietary model" and "open-format model" as two separate model format categories for RAN1 discussion, From RAN1 discussion viewpoint, RAN1 may assume that Proprietary-format models are not mutually recognizable across vendors, hide model design information from other vendors when shared. Further, open-format models are mutually recognizable between vendors, do not hide model design information from other vendors when shared.

FIG. 1C shows a working assumption for model identification and for functionality identification.

As defined in the list of terminologies in section 2, model monitoring can be referred to as a procedure that monitors the inference performance of the AI/ML model. As both model-ID-based and functionality-based life cycle management are being considered in RAN1, this monitoring process can also be based on the ML model or Model functionality level. For beam prediction sub-use cases, i.e., BM-Case1 & BM-Case2, it is understood that model/functionality monitoring is very important, especially when the UE side applies the model.

When the UE uses a limited set of beam measurements (set B) as the input of an ML model and the ML model predicts the best beams from a set of beams (Set A) that is not measured fully by the UE beams, the probability of having errors during the inference stage of the model can be high, especially when changes on radio parameters/conditions occur in the network. Also, model monitoring may be necessary in some cases before using the model in new radio environments/conditions/parameters.

The details supporting a framework for model/functionality monitoring for beam prediction have yet to be fully discussed in 3GPP, and example embodiments of this invention provide a solution to that.

When a UE supports beam prediction in the spatial domain and/or temporal domain, i.e., BM-Case1 and/or BM-Case2, the following solution is used to support ML model monitoring.

Example embodiments of the invention provide new procedures to at least identify ML model/functionality failures related to the beam prediction may be configured/defined to the UE.

Figure 3:
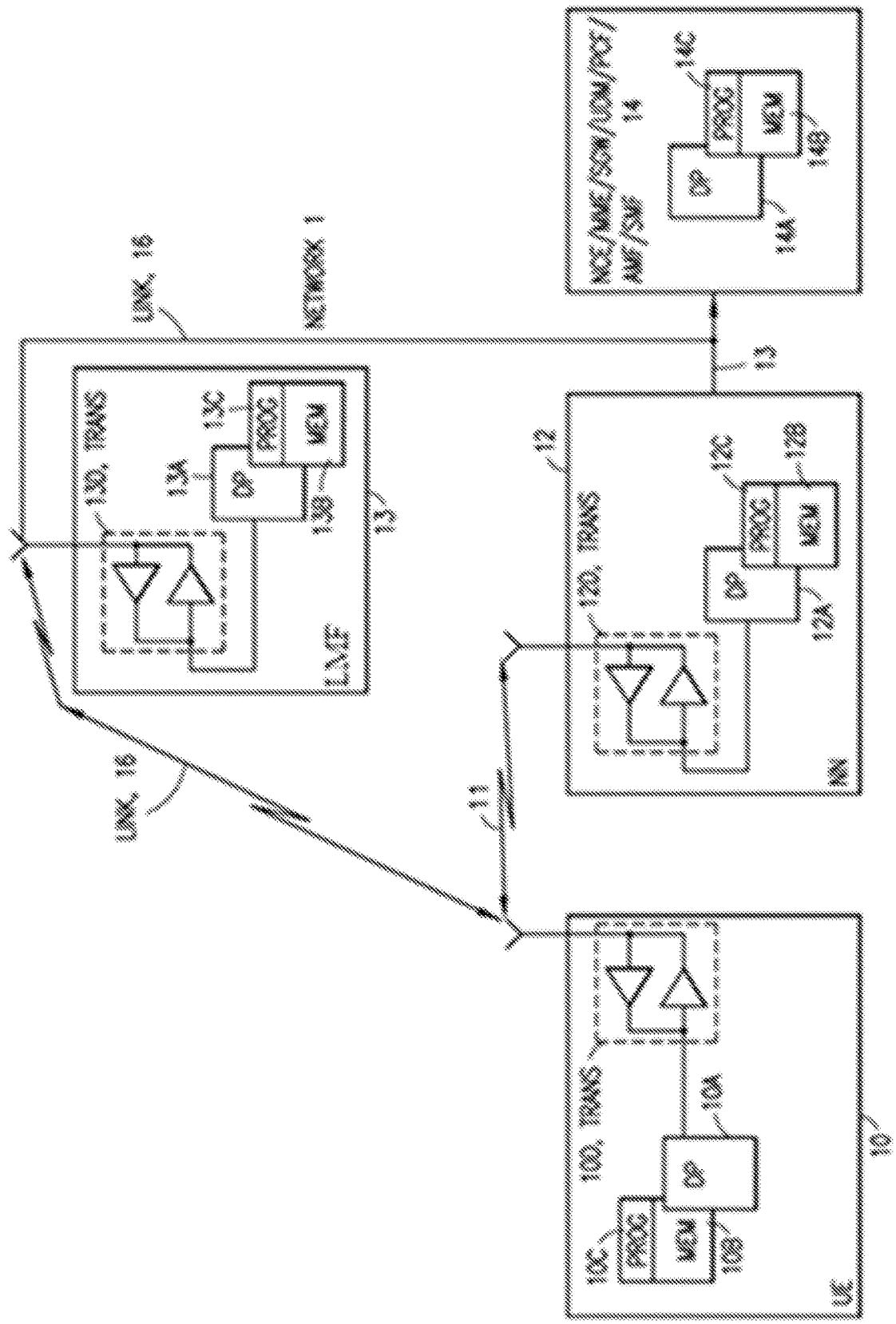
FIG. 3 shows a high level block diagram of various devices used in carrying out various aspects of the invention.

Before describing the example embodiments as disclosed herein in detail, reference is made to FIG. 3 for illustrating a simplified block diagram of various electronic devices that are suitable for use in practicing the example embodiments of this invention.

FIG. 3 shows a block diagram of one possible and non-limiting exemplary system in which the example embodiments may be practiced. In FIG. 3, a user equipment (UE) 10 is in wireless communication with a wireless network 1 or network, 1 as in FIG. 3. The wireless network 1 or network 1 as in FIG. 3 can comprise a communication network such as a mobile network e.g., the mobile network 1 or first mobile network as disclosed herein. Any reference herein to a wireless network 1 as in FIG. 3 can be seen as a reference to any wireless network as disclosed herein. Further, the wireless network 1 as in FIG. 3 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12. The one or more memories MEM 10B include computer program code PROG 10C. The UE 10 communicates with NN 12 via a wireless link 11 or 16.

The NN 12 (NR/5G Node B, an evolved NB, or LTE device) is a network node such as a master or secondary node base station (e.g., for NR or LTE long term evolution) that communicates with devices such as UE 10 of FIG. 3. The NN 12 provides access to wireless devices such as the UE 10 to the wireless network 1. The NN 12 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments. Each of the one or more transceivers TRANS 12D includes a receiver and a transmitter. The one or more transceivers TRANS 12D can be optionally connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB such as via link 16. Further, the link 11, link 16 and/or any other link may be wired or wireless or both and may implement, e.g., an X2 or Xn interface. Further the link 11 and/or link 16 may be through other network devices such as, but not limited to an NCE/MME/SGW/UDM/PCF/AMF/SMF 14 device as in FIG. 3. The NN 12 may perform functionalities of an MME (Mobility Management Entity) or SGW (Serving Gateway), such as a User Plane Functionality, and/or an Access Management functionality for LTE and similar functionality for 5G.

The LMF 13 (a NR/5G, evolved NB, or LTE device) is a network device such as a device including a location management function device (e.g., for NR or LTE long term evolution) that communicates with devices such the NN 12 and UE 10 of FIG. 3. The LMF 13 can be associated with a mobility function device such as an AMF or SMF, further the LMF 13 may communicate with devices such as the NN 12 and/or UE 10 and/or the wireless network 1. The LMF 13 includes one or more processors DP 13A, one or more memories MEM 13B, one or more network interfaces, and one or more transceivers TRANS 13D interconnected through one or more buses. In accordance with the example embodiments these network interfaces of LMF 13 can include X2 and/or Xn interfaces for use to perform the example embodiments. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the LMF 13 to perform one or more of the operations as described herein. The LMF 13 may communicate with another mobility function device and/or eNB such as the NN 12 and the UE 10 or any other device or the NCE/MME/SGW/UDM/PCF/AMF/SMF 14 using, e.g., link 11 or link 16 or another link. The Link 16 as shown in FIG. 3 can be used for communication between the NN12 and the NN13. These links maybe wired or wireless or both and may implement, e.g., an X2 or Xn interface. Further, as stated above the link 11 and/or link 16 may be through other network devices such as, but not limited to an NCE/MME/SGW device such as the NCE/MME/SGW/UDM/PCF/AMF/SMF 14 of FIG. 3.

The one or more buses of the device of FIG. 3 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and these devices can include one or more buses that could be implemented in part as fiber optic cable to connect the other elements of the NN 12 to a RRH.

It is noted that although FIG. 3 shows a network node such as NN 12, this node can incorporate or be incorporated into an eNodeB or eNB or gNB such as for LTE and NR, and would still be configurable to perform example embodiments.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a NCE/MME/SGW/UDM/PCF/AMF/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management Function (AMF) functionality, and/or Session Management (SMF) functionality, and/or Location Management Function (LMF), and/or Authentication Server (AUSF) functionality and which provides connectivity with a further network, such as a telephone network and/or a data communications network (e.g., the Internet), and which is configured to perform any 5G and/or NR operations in addition to or instead of other standard operations at the time of this application. The NCE/MME/SGW/UDM/PCF/AMF/SMF 14 is configurable to perform operations in accordance with example embodiments in any of an LTE, NR, 5G and/or any standards based communication technologies being performed or discussed at the time of this application. In addition, it is noted that the operations in accordance with example embodiments, as performed by the NN 12 and/or LMF 13, may also be performed at the NCE/MME/SGW/UDM/PCF/AMF/SMF 14.

The NCE/MME/SGW/UDM/PCF/AMF/SMF 14 includes one or more processors DP 14A, one or more memories MEM 14B, and one or more network interfaces (N/W I/F(s)), interconnected through one or more buses coupled with the link 13 and/or link 16. In accordance with the example embodiments these network interfaces can include X2 and/or Xn interfaces for use to perform the example embodiments. The one or more memories MEM 14B include computer program code PROG 14C. The one or more memories MEM14B and the computer program code PROG 14C are configured to, with the one or more processors DP 14A, cause the NCE/MME/SGW/UDM/PCF/AMF/SMF 14 to perform one or more operations which may be needed to support the operations in accordance with the example embodiments.

It is noted that that the NN 12 and/or LMF 13 and/or UE 10 can be configured (e.g. based on standards implementations etc.) to perform functionality of a Location Management Function (LMF). The LMF functionality may be embodied in any of these network devices or other devices associated with these devices. In addition, functions of an LMF such as the LMF 13 can be co-located with UE 10 such as to be separate from the NN 12 and/or LMF 13 of FIG. 3 for performing operations in accordance with example embodiments as disclosed herein.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, LMF 13, and other functions as described herein.

In general, various embodiments of any of these devices can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Further, the various embodiments of any of these devices can be used with a UE vehicle, a High Altitude Platform Station, or any other such type node associated with a terrestrial network or any drone type radio or a radio in aircraft or other airborne vehicle or a vessel that travels on water such as a boat.

As similarly stated above example embodiments of the invention provide new procedures to at least identify ML model/functionality failures related to the beam prediction may be configured/defined to the UE as follows:

- ML Model/functionality failure is detected by counting beam prediction failure instances indication from lower layers to the MAC entity. The MAC entity can be configured per Model functionality (identified by a model functionality ID or refer as a single configuration related to the ML feature/use case/sub-use case) or per ML model (identified by a model ID);
- The MAC entity may count beam prediction failure instances by considering a start count (e.g., failure count=0 or failure count=X, where X is the count coming from an earlier instance of counting the model failure instances) at the beginning of a pre-configured timer or window applicable for detecting the beam prediction related Model/functionality failures;
- One count may be added to the ML model/functionality failure count (failure count) when the ML model/functionality usage in the Phy. layer declares a failure. To support the failures in ML model/functionality usage in the Phy. Layer, one or more of the following can be considered:
  - The UE may be configured/defined to use at least one reference signal resource (RS), refer as model monitoring resource Q_0, which is associated with the Model functionality (in one variant this may be identified by a functionality ID) or ML Model (in one variant this may be identified by a model ID),
  - The UE may be configured/indicated to receive at least one reference signal resource (RS), refer as model monitoring resource Q_0, in a periodic/semi-persistent/aperiodic manner,
  - The UE receives/measures the model monitoring resource Q_0 and determines the signal quality (e.g., L1-RSRP or L1-SINR) of Q_0,
  - The UE determines an ML model/functionality usage in the Phy. layer:
    - In one variant, the UE compares the received signal quality (L1-RSRP) with a pre-configured/defined threshold for the expected signal quality of the model monitoring resource Q_0 and determines a failure instance if the signal quality of the model monitoring resource Q_0 is below the pre-configured/defined threshold,
    - In another variant, the UE compares the ML model output, which gives the best-predicted beams, with the model monitoring resource Q_0, and determines a failure instance if the model monitoring resource Q_0 is not within the best-predicted beams;
  - The UE may be configured with a time window in which the UE evaluates the failure as an average(or worst) considering the above variants.
- When the count in the MAC entity reaches (or goes above) a pre-defined/configured threshold (maximum failure count=L) prior to the end of a pre-configured timer or window applicable for detecting the beam prediction-related Model/functionality failures, the MAC entity may declare an ML Model/functionality failure for the considered Model functionality (functionality ID) or Model ID, and may not continue to use it.
- When the count in the MAC entity does not reach (or go above) a pre-defined/configured threshold (maximum failure count=L) prior to the end of a pre-configured timer or window applicable for detecting the beam prediction related Model/functionality failures, the MAC entity may not declare an ML Model/functionality failure for the considered Model functionality (functionality ID) or Model ID, and may continue to use it.

Figure 2B:
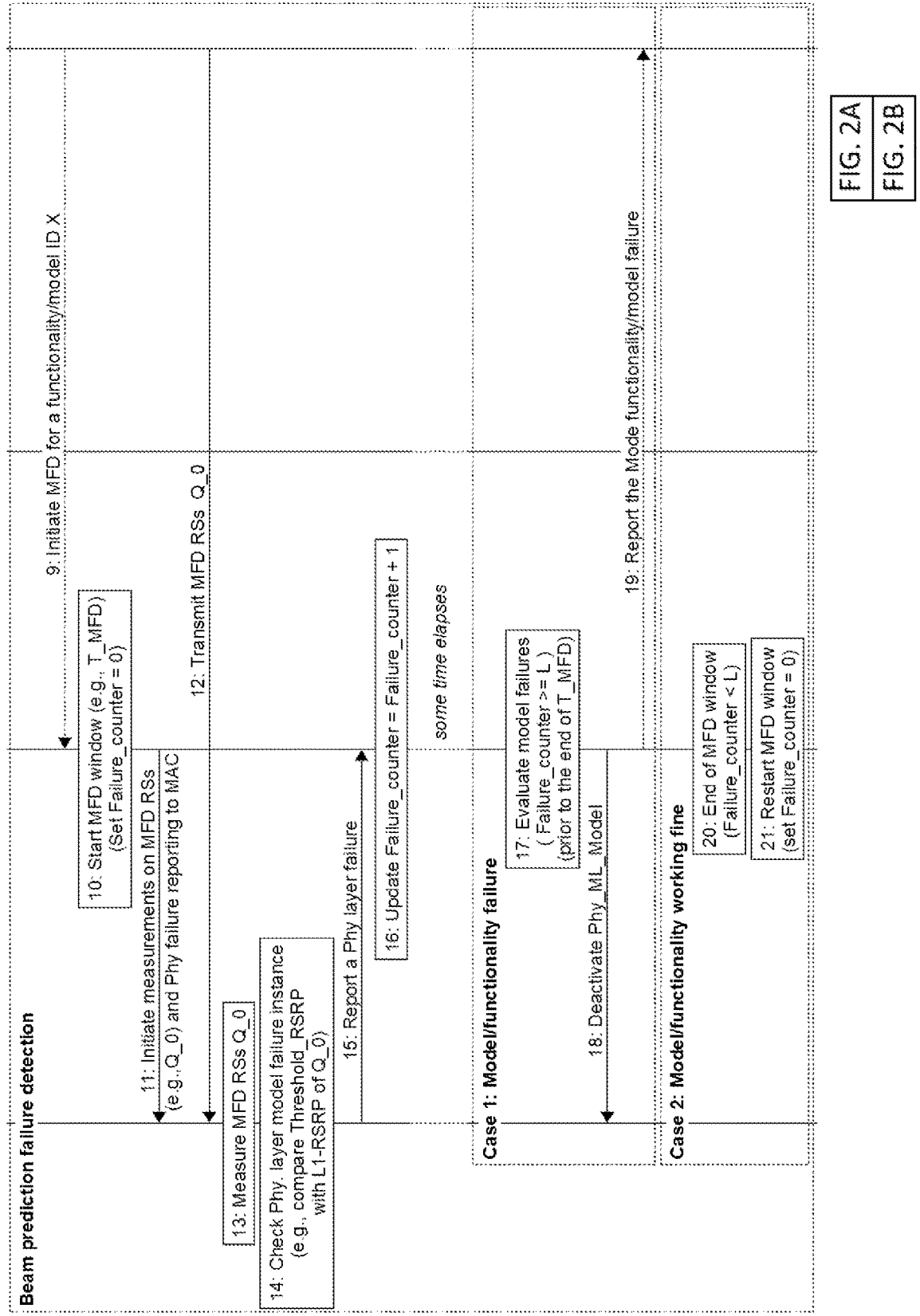

FIG. 2A and FIG. 2B show a signalling diagram for model/functionality failure detection in NR.

The details of the steps of FIG. 2A and FIG. 2B are further explained as below.

RRC Configuration to the UE

Step 1: After a proper UE capability enquiry, the gNB may first get the information that the UE supports beam prediction (BP) in spatial domain (or temporal domain), and gNB sends a RRC configuration to configure ML-based beam prediction (BP) at the UE. This configuration may carry the following information (via IEs in RRC) which shall be used for BP failure detection:
- Model Failure Detection (MFD) RSs (e.g., Q_0)—
  - These resources can often be SSBs, CSI-RS, MFD window (e.g., T_MFD)—The time window may be in the range of milliseconds or Seconds, MFD max failure count (e.g., L)—In one variant, the MFD max failure counts may be defined in 3GPP RAN4 requirements for the BP use cases, MFD Phy threshold (e.g., Threshold_RSRP, Model_Accuracy)—In one variant, the MFD Phy threshold may be defined in RAN4 requirements for the BP use cases, Other MFD-related parameters—e.g., UL resources to be used for reporting BP model failures, The above information may be configured as a list or as separate IEs in RRC and can associate with a list of ML-Model-IDs/ML-functionality-IDs or with one ML model/Model functionality.

Additionally, the RRC configuration is expected to configure parameters related to BP inference (e.g., beam measurement resource set, beam prediction resource set, etc. . . . ):

Step 2/3: When the UE receives the RRC configuration for ML-based BP, the received configuration parameters/information may be delivered to MAC and Phy. Layer (which is also assumed to interact with the ML-based beam prediction model/functionality):

The required information at the MAC may be the MFD window (e.g., T_MFD) and MFD max failure count (e.g., L), The required information at the Phy. layer may be Model Failure Detection (MFD) RSs (e.g., Q_0), MFD Phy threshold (e.g., Threshold_RSRP, Model_Accuracy), etc. . . .

Beam Prediction and Reporting

Step 4-8: When the UE is configured to use ML-based BP at the UE side, the UE is expected to measure (Step 4-5) a measurement set (e.g., Set B' beams/DL RSs) according to the indicated/configured set-up. When the measurement results are available for Set B', the UE uses the full or part of the measured beams (L1-RSRP for Set B (could be a subset of Set B') or Set B') at the input of the ML model used for beam prediction (Step 6) and determines (Step 7) the best beam (predicted beams) from a larger/different set of beams (Set A). In step 8, the UE may report the best-predicted beams to the gNB. It should be noted that this process can go on at any of the later stages (while model failure detection is ongoing).

Beam Prediction Failure Detection

Step 9: In one variant, the UE may receive an indicator to start the beam prediction failure detection, where such a trigger may come from DCI or MAC-CE. The trigger could also indicate the related ML model or Model functionality to initiate the model failure detection.

Step 10: The MAC entity may start the MFD window for a given ML model or Model functionality, and the MFD process may be identified by the identifier associated with the ML model or Model functionality. Here, MAC maintained Failure count (e.g., Failure_Counter) might be set to zero. In another variant, this start failure count may come from the end of the previous MFD window (the latest Failure_Counter value).

Step 11: The MAC entity may indicate the start of the MFD window and measurements of MFD RSs to the Phy layer, and also request reporting of the Phy. layer model failures to the MAC entity.

Step 12-14: The network is expected to transmit the RSs that are used for MFD. The UE measures these MFD RSs (Q_0). As in Step 14, the Phy. layer model failure instance(s) are determined based on the received signal quality of the MFD RSs:

In one variant, the UE compares the received signal quality (L1-RSRP) with a pre-configured/defined threshold for the expected signal quality of the model monitoring resource Q_0 and determines a failure instance if the signal quality of the model monitoring resource Q_0 is below the pre-configured/defined threshold.

In another variant, the UE compares the ML model output, which gives the best-predicted beams, with the model monitoring resource Q_0, and determines a failure instance if the model monitoring resource Q_0 is not within the best-predicted beams.

Step 15-16: One count may be added to the ML model/functionality failure count (Failure_count) when the ML model/functionality usage in the Phy. layer declares a failure. This process is expected to continue until the end of the MFD window or until the MAC entity can declare a model failure or functionality failure.

Step 17-19: When the count in the MAC entity reaches (or goes above) a pre-defined/configured threshold (maximum failure count=>L) prior to the end of a pre-configured timer or window applicable for detecting the beam prediction-related Model/functionality failures, the MAC entity may declare an ML Model/functionality failure for the considered Model functionality (functionality ID) or Model ID, and may not continue to use it. Such failures may trigger reporting to the gNB, where step 19 may be used by the UE.

Step 20-21: When the count in the MAC entity does not reach (or go above) a pre-defined/configured threshold (maximum failure count=L) prior to the end of a pre-configured timer or window applicable for detecting the beam prediction related Model/functionality failures, the MAC entity may not declare an ML Model/functionality failure for the considered Model functionality (functionality ID) or Model ID, and may continue to use it.

The novel steps as shown in FIG. 2A and FIG. 2B include model failure detection (MFD) RSs (e.g., Q_0) MFD Window (e.g., T_MFD), MFD max failure count (e.g., L), MFD Phys threshold (e.g. Threshold_RSRP, Model Accuracy), and other MFD related parameters; step 9: Initiate MFD for functionality/model ID X; step 11. Initiate measurements on MFD RSs (e.g., Q_0) and PHY failure reporting to MAC; step 12. Transmit MFD RSs Q_0;; step 13. Measure MFD RSs Q_0; step 14. Check PHY layer model failure instance (e.g., compare Threshold_RSRP with L1-RSRP of Q_0; step 15. Report a PHY layer failure; step 16. Update Failure_Counter=Failure_counter+1; step 17. Evaluate model failures (Failure_counter>=L) (prior to end of T_MFD); step 18. Deactivate Phy_ML_Model; step 19. Report the Mode functionality/model failure; 20. End of MFD window (failure counter<1); and step 21. Restart MFD window (set failure counter=0).

Figure 4B:
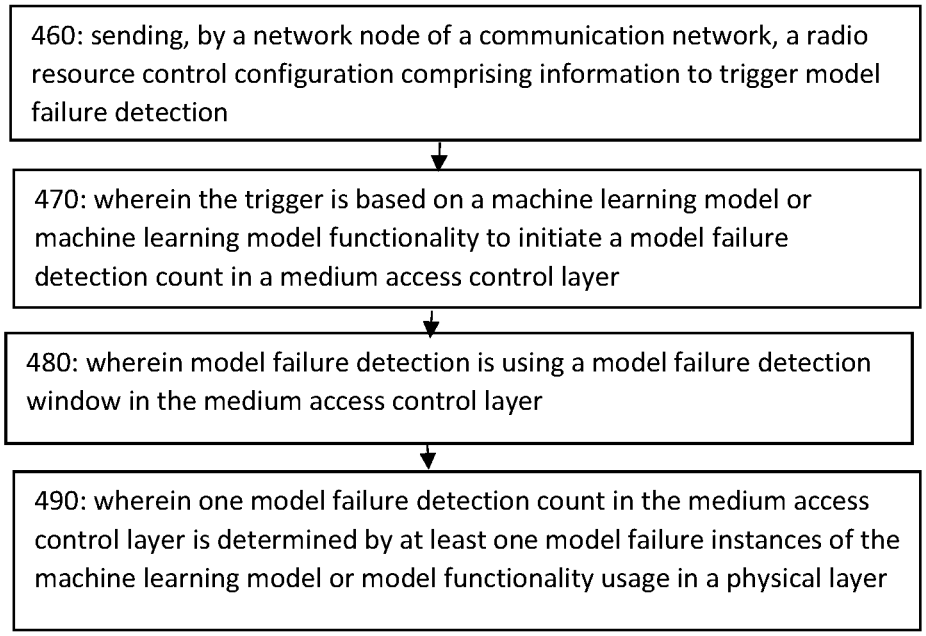

FIG. 4A and FIG. 4B each show a method in accordance with example embodiments of the invention which may be performed by an apparatus.

FIG. 4A illustrates operations which may be performed by a device such as, but not limited to, a device such as a network device (e.g., the UE 10 as in FIG. 3). As shown in step 410 of FIG. 4A there is receiving, by a user equipment of a communication network, from a network node a radio resource control configuration comprising information to trigger model failure detection. As shown in step 420 of FIG. 4A wherein the trigger is based on a machine learning model or machine learning model functionality to initiate a model failure detection count in a medium access control layer. As shown in step 430 of FIG. 4A wherein model failure detection is using a model failure detection window in the medium access control layer. As shown in step 440 of FIG. 4A wherein one model failure detection count in the medium access control layer is determined by at least one model failure instances of the machine learning model or model functionality usage in a physical layer. Then as shown in step 410 of FIG. 4A there is determining by the user equipment the model failure for the machine learning model or machine learning model functionality when the model failure detection count in the medium access control layer is equal to or above a maximum model failure count prior to the end of the model failure detection window in the medium access control layer.

In accordance with the example embodiments as described in the paragraph above, wherein the information to trigger is providing model failure detection reference signal resources for model failure detection comprising at least one of synchronization signal blocks or channel state information reference signals.

In accordance with the example embodiments as described in the paragraphs above, wherein the information to trigger comprises at least one of: model failure detection reference signals or Q_0, model failure detection window or T_MFD, model failure detection max failure count or L, model failure detection physical threshold, reference signal received power, model_accuracy, or other model failure detection related parameters or uplink resources to be used for reporting model failures.

In accordance with the example embodiments as described in the paragraphs above, wherein the model failure detection window in the medium access control layer is a time window in a range of milliseconds or seconds.

In accordance with the example embodiments as described in the paragraphs above, wherein the radio resource control configuration comprises a list of separate information elements associated with machine learning model functionalities and identifications.

In accordance with the example embodiments as described in the paragraphs above, wherein there is starting with a medium access control entity the model failure detection window for a given machine learning model or functionality.

In accordance with the example embodiments as described in the paragraphs above, wherein the given machine learning model or functionality is associated with the list of separate information elements associated with machine learning model functionalities and identifications.

In accordance with the example embodiments as described in the paragraphs above, wherein a medium access control maintained failure has a starting count starting from one of zero or an end of a previous model failure detection window.

In accordance with the example embodiments as described in the paragraphs above, wherein there is indicating with the medium access control entity to a physical layer the start of the model failure detection window and measurements of model failure detection reference signals, and requesting reporting of physical layer model failures to the medium access control entity.

In accordance with the example embodiments as described in the paragraphs above, wherein there is comparing a received signal quality based on reference signal received power with a pre-configured or defined threshold for an expected signal quality of a model monitoring resource $Q\_0$; and determining a failure instance if the signal quality of the model monitoring resource $Q\_0$ is below the pre-configured/defined threshold.

In accordance with the example embodiments as described in the paragraphs above, wherein there is comparing the machine learning model output giving best-predicted beams with a model monitoring resource $Q\_0$; and determining a failure instance if the model monitoring resource $Q\_0$ is not within the best-predicted beams.

In accordance with the example embodiments as described in the paragraphs above, wherein there is sending by the user equipment a beam prediction report based on a model failure detection count being equal to or above the pre-determined model failure detection physical threshold during the model failure detection window.

A non-transitory computer-readable medium (MEM 10B as in FIG. 3) storing program code (PROG 10C of as in FIG. 3), the program code executed by at least one processor (DP 10A as in FIG. 3) to perform the operations as at least described in the paragraphs above.

In accordance with an example embodiment of the invention as described above there is an apparatus comprising: means for receiving (one or more transceivers 10D; MEM 10B; PROG 10C; and DP 10A as in FIG. 3), by a user equipment (UE 10 as in FIG. 3) one or more transceivers 10D; MEM 10B; PROG 10C; and DP 10A as in FIG. 3) of a communication network (Network 1 as in FIG. 3), from a network node (NN 12 as in FIG. 3) a radio resource control configuration comprising information to trigger (one or more transceivers 10D; MEM 10B; PROG 10C; and DP 10A as in FIG. 3) model failure detection, wherein the trigger is based on a machine learning model or machine learning model functionality to initiate a model failure detection count in a medium access control layer, wherein model failure detection is using a model failure detection window in the medium access control layer, and wherein one model failure detection count in the medium access control layer is determined by at least one model failure instances of the machine learning model or model functionality usage in a physical layer; and determining (one or more transceivers 10D; MEM 10B; PROG 10C; and DP 10A as in FIG. 3) by the user equipment the model failure for the machine learning model or machine learning model functionality when the model failure detection count in the medium access control layer is equal to or above a maximum model failure count prior to the end of the model failure detection window in the medium access control layer.

In the example aspect of the invention according to the paragraph above, wherein at least the means for receiving, triggering, and determining comprises a non-transitory computer readable medium [MEM 10B as in FIG. 3] encoded with a computer program [PROG 10C as in FIG. 3] executable by at least one processor [DP 10A as in FIG. 3].

FIG. 4B illustrates operations which may be performed by a device such as, but not limited to, a device such as network node (e.g., the NN 12 and/or LMF 13 as in FIG. 3). As shown in step 460 of FIG. 4B there is sending, by a network node of a communication network, a radio resource control configuration comprising information to trigger model failure detection. As shown in step 470 of FIG. 4B wherein the trigger is based on a machine learning model or machine learning model functionality to initiate a model failure detection count in a medium access control layer. As shown in step 480 of FIG. 4B wherein model failure detection is using a model failure detection window in the medium access control layer. Then as shown in step 490 of FIG. 4B wherein one model failure detection count in the medium access control layer is determined by at least one model failure instances of the machine learning model or model functionality usage in a physical layer.

In accordance with the example embodiments as described in the paragraphs above, wherein the information causes model failure detection count for the model failure for the machine learning model or machine learning model functionality when the model failure detection count in the medium access control layer is equal to or above a maximum model failure count prior to the end of the model failure detection window in the medium access control layer.

In accordance with the example embodiments as described in the paragraphs above, wherein the information to trigger comprises at least one of: model failure detection reference signals or Q_0, model failure detection window or T_MFD, model failure detection max failure count or L, model failure detection physical threshold, reference signal received power, model_accuracy, or other model failure detection related parameters or uplink resources to be used for reporting model failures.

In accordance with the example embodiments as described in the paragraphs above, wherein the model failure detection window in the medium access control layer is a time window in a range of milliseconds or seconds.

In accordance with the example embodiments as described in the paragraphs above, wherein the radio resource control configuration comprises a list of separate information elements associated with machine learning model functionalities and identifications.

In accordance with the example embodiments as described in the paragraphs above, wherein there is starting with a medium access control entity the model failure detection window for a given machine learning model or functionality.

In accordance with the example embodiments as described in the paragraphs above, wherein the given machine learning model or functionality is associated with the list of separate information elements associated with machine learning model functionalities and identifications.

In accordance with the example embodiments as described in the paragraphs above, wherein a medium access control maintained failure has a starting count starting from one of zero or an end of a previous model failure detection window.

In accordance with the example embodiments as described in the paragraphs above, wherein there is indicating with the medium access control entity to a physical layer the start of the model failure detection window and measurements of model failure detection reference signals, and requesting reporting of physical layer model failures to the medium access control entity.

In accordance with the example embodiments as described in the paragraphs above, wherein there is comparing a received signal quality based on reference signal received power with a pre-configured or defined threshold for an expected signal quality of a model monitoring resource Q_0; and determining a failure instance if the signal quality of the model monitoring resource Q_0 is below the pre-configured/defined threshold.

In accordance with the example embodiments as described in the paragraphs above, wherein there is comparing the machine learning model output giving best-predicted beams with a model monitoring resource Q_0; and determining a failure instance if the model monitoring resource Q_0 is not within the best-predicted beams.

In accordance with the example embodiments as described in the paragraphs above, wherein there is sending by the user equipment a beam prediction report based on a model failure detection count being equal to or above the pre-determined model failure detection physical threshold during the model failure detection window.

A non-transitory computer-readable medium (MEM 12B and/or MEM 13B as in FIG. 3) storing program code (PROG 12C and/or PROG 13C as in FIG. 3), the program code executed by at least one processor (DP 12A and/or DP 13A as in FIG. 3) to perform the operations as at least described in the paragraphs above.

In accordance with an example embodiment of the invention as described above there is an apparatus comprising: means for sending (TRANS 12D and/or TRANS 13D, DP 12A and/or DP 13A, PROG 12C and/or PROG 13C, and MEM 12B and/or MEM 13B as in FIG. 3), by a network node (NN 12 as in FIG. 3) of a communication network (Network 1 as in FIG. 3), a radio resource control configuration (TRANS 12D and/or TRANS 13D, DP 12A and/or DP 13A, PROG 12C and/or PROG 13C, and MEM 12B and/or MEM 13B as in FIG. 3) comprising information to trigger model failure detection, wherein the trigger is based on a machine learning model or machine learning model functionality to initiate a model failure detection count in a medium access control layer, wherein model failure detection is using (TRANS 12D and/or TRANS 13D,, DP 12A and/or DP 13A, PROG 12C and/or PROG 13C, and MEM 12B and/or MEM 13B as in FIG. 3) a model failure detection window in the medium access control layer, and wherein one model failure detection count in the medium access control layer is determined (TRANS 12D and/or TRANS 13D, DP 12A and/or DP 13A, PROG 12C and/or PROG 13C, and MEM 12B and/or MEM 13B as in FIG. 3) by at least one model failure instances of the machine learning model or model functionality usage in a physical layer.

In the example aspect of the invention according to the paragraph above, wherein at least the means for sending, configuring, using, and determining comprises a non-transitory computer readable medium [MEM 12B and/or MEM 13B as in FIG. 3] encoded with a computer program [PROG 12C and/or PROG 13C as in FIG. 3] executable by at least one processor [DP 12A and/or DP 13A as in FIG. 3].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
  (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
  (a) hardware-only circuit implementations (such as implementations in only analog and/or digital circuitry); and
  (b) to combinations of circuits and software (and/or firmware), such as (as applicable):
  (i) to a combination of processor(s) or (ii) to portions of processor(s)/software (including digital signal processor(s)), software, and memory(ies) that work together to cause an apparatus, such as a mobile phone or server, to perform various functions); and
  (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of example embodiments of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
at least one processor; and
at least one non-transitory memory storing instructions, that when executed by the at least one processor, cause the apparatus at least to:
  receive, by a user equipment of a communication network, from a network node a radio resource control configuration comprising information to trigger model failure detection,
  wherein the information to trigger is based on a machine learning model or machine learning model functionality to initiate a model failure detection count in a medium access control layer,
  wherein model failure detection includes using a model failure detection window in the medium access control layer and wherein one model failure detection count in the medium access control layer is determined by at least one or more model failure instances of the machine learning model or model functionality usage in a physical layer; and
determine by the user equipment a model failure for the machine learning model or machine learning model functionality when the model failure detection count in the medium access control layer is equal to or above a maximum model failure count prior to an end of the model failure detection window in the medium access control layer;
wherein the radio resource control configuration comprises a list of separate information elements associated with machine learning model functionalities and identifications.

2. The apparatus of claim 1, wherein the information to trigger is providing model failure detection reference signal resources for model failure detection comprising at least one of synchronization signal blocks or channel state information reference signals.

3. The apparatus of claim 1, wherein the information to trigger comprises at least one of the following:
model failure detection reference signals,
model failure detection window,
model failure detection max failure count,
model failure detection physical threshold,
reference signal received power,
model accuracy, or
other model failure detection related parameters or uplink resources to be used for reporting model failures.

4. The apparatus of claim 1, wherein the model failure detection window in the medium access control layer is a time window in a range of milliseconds or seconds.

5. The apparatus of claim 1, wherein the at least one non-transitory memory storing instructions executed by the at least one processor to cause the apparatus to:
start with a medium access control entity, the model failure detection window for a given machine learning model or functionality, wherein the given machine learning model or functionality is associated with the list of separate information elements associated with machine learning model functionalities and identifications.

6. The apparatus of claim 5, wherein a medium access control maintained failure has a starting count starting from one of zero or an end of a previous model failure detection window.

7. The apparatus of claim 5, wherein the at least one non-transitory memory storing instructions executed by the at least one processor to cause the apparatus to:
indicate with the medium access control entity to a physical layer the start of the model failure detection window and measurements of model failure detection reference signals, and
request reporting of physical layer model failures to the medium access control entity.

8. The apparatus of claim 1, wherein the at least one non-transitory memory storing instructions executed by the at least one processor to cause the apparatus to:
compare a received signal quality based on reference signal received power with a pre-configured or defined threshold for an expected signal quality of a model monitoring resource; and
determine a failure instance if the signal quality of the model monitoring resource is below the pre-configured/defined threshold.

9. The apparatus of claim 1, wherein the at least one non-transitory memory storing instructions executed by the at least one processor to cause the apparatus to:
compare a machine learning model output giving best-predicted beams with a model monitoring resource; and
determine a failure instance if the model monitoring resource is not within the best-predicted beams.

10. The apparatus of claim 1, wherein the at least one non-transitory memory storing instructions executed by the at least one processor to cause the apparatus to:
send by the user equipment a beam prediction report based on a model failure detection count being equal to or above a pre-determined model failure detection physical threshold during the model failure detection window.

11. An apparatus, comprising:
at least one processor; and
at least one non-transitory memory storing instructions, that when executed by the at least one processor, cause the apparatus at least to:
send, by a network node of a communication network, a radio resource control configuration comprising information to trigger model failure detection,
wherein the information to trigger is based on a machine learning model or machine learning model functionality to initiate a model failure detection count in a medium access control layer,
wherein model failure detection includes using a model failure detection window in the medium access control layer and
wherein one model failure detection count in the medium access control layer is determined by at least one or more model failure instances of the machine learning model or model functionality usage in a physical layer; and
wherein the radio resource control configuration comprises a list of separate information elements associated with machine learning model functionalities and identifications.

12. The apparatus of claim 11, wherein the information to trigger model failure detection causes model failure detection count for a model failure for the machine learning model or machine learning model functionality when the model failure detection count in the medium access control layer is equal to or above a maximum model failure count prior to an end of the model failure detection window in the medium access control layer.

13. The apparatus of claim 11, wherein the information to trigger comprises at least one of the following:
model failure detection reference signals,
model failure detection window,
model failure detection max failure count,
model failure detection physical threshold,
reference signal received power,
model_accuracy, or
other model failure detection related parameters or uplink resources to be used for reporting model failures.

14. The apparatus of claim 11, wherein the model failure detection window in the medium access control layer is a time window in a range of milliseconds or seconds.

15. The apparatus of claim 11, wherein the at least one non-transitory memory storing instructions executed by the at least one processor to cause the apparatus to:
start with a medium access control entity, the model failure detection window for a given machine learning model or functionality, wherein the given machine learning model or functionality is associated with the list of separate information elements associated with machine learning model functionalities and identifications.

16. The apparatus of claim 15, wherein a medium access control maintained failure has a starting count starting from one of zero or an end of a previous model failure detection window.

17. The apparatus of claim 15, wherein the at least one non-transitory memory storing instructions executed by the at least one processor to cause the apparatus to:
    indicate with the medium access control entity to a physical layer the start of the model failure detection window and measurements of model failure detection reference signals, and
    request reporting of physical layer model failures to the medium access control entity.

* * * * *